March 28, 1939. O. E. SZEKELY 2,152,622
VARIABLE RATIO POWER TRANSMISSION
Filed Nov. 19, 1932 6 Sheets-Sheet 3
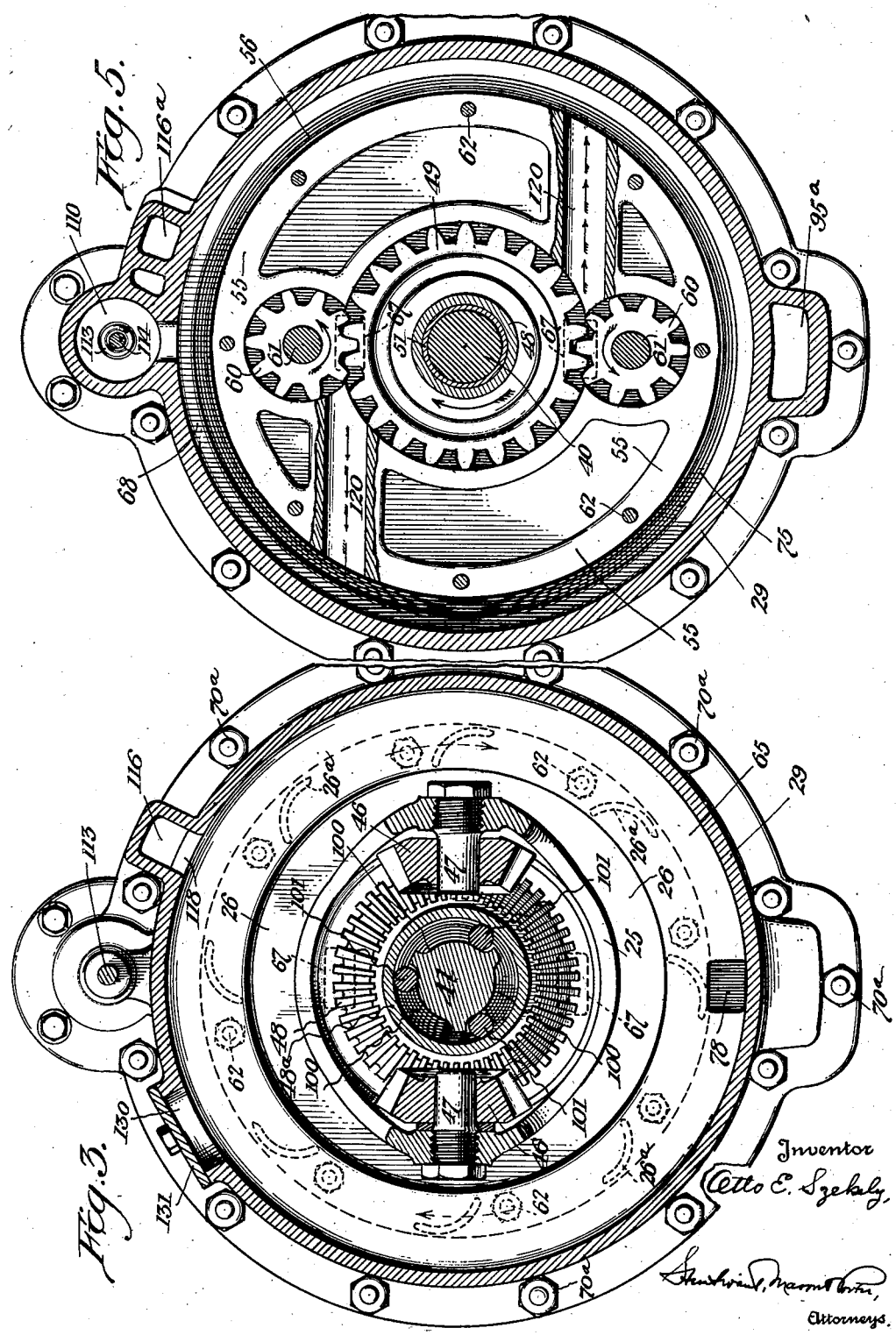

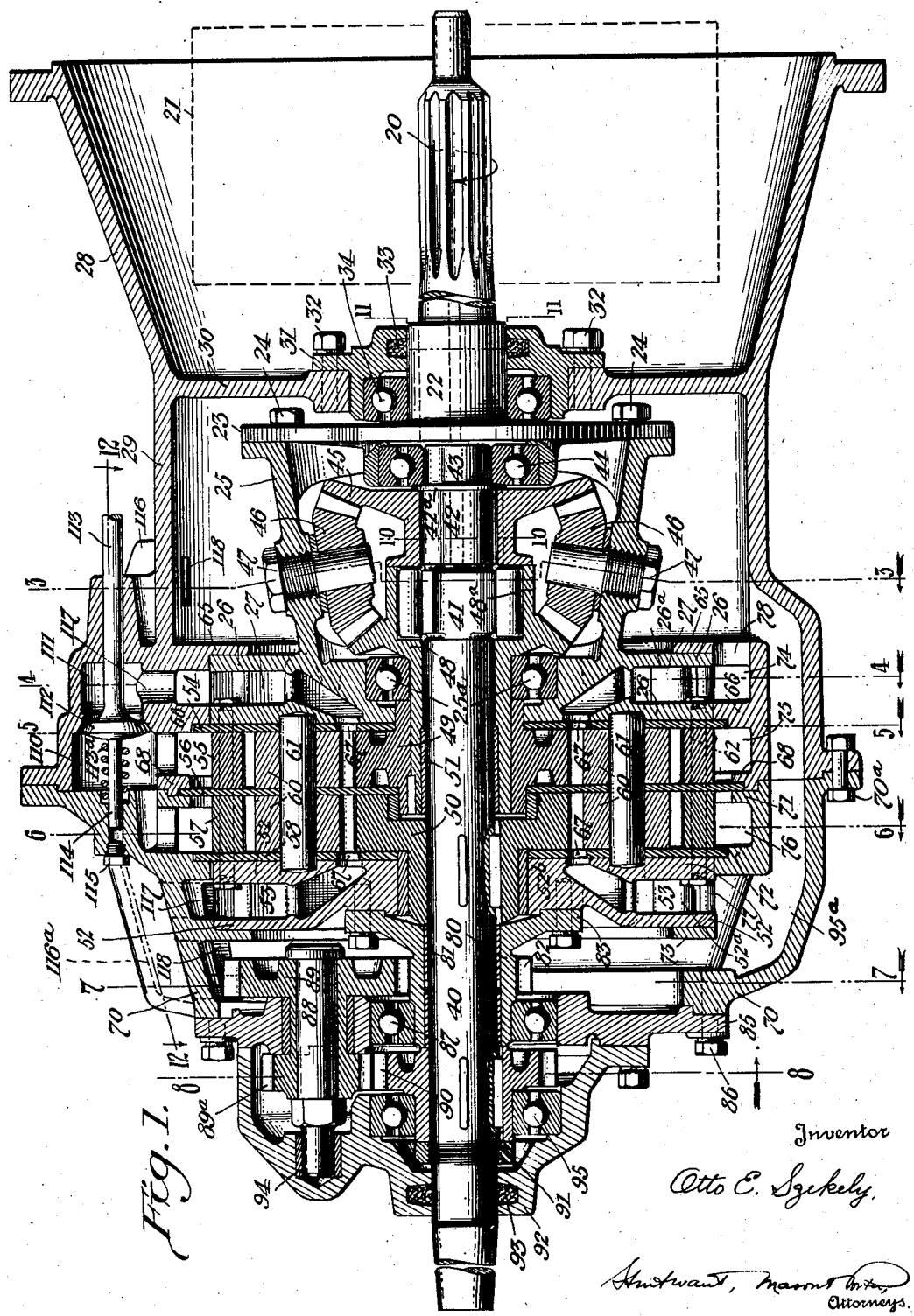

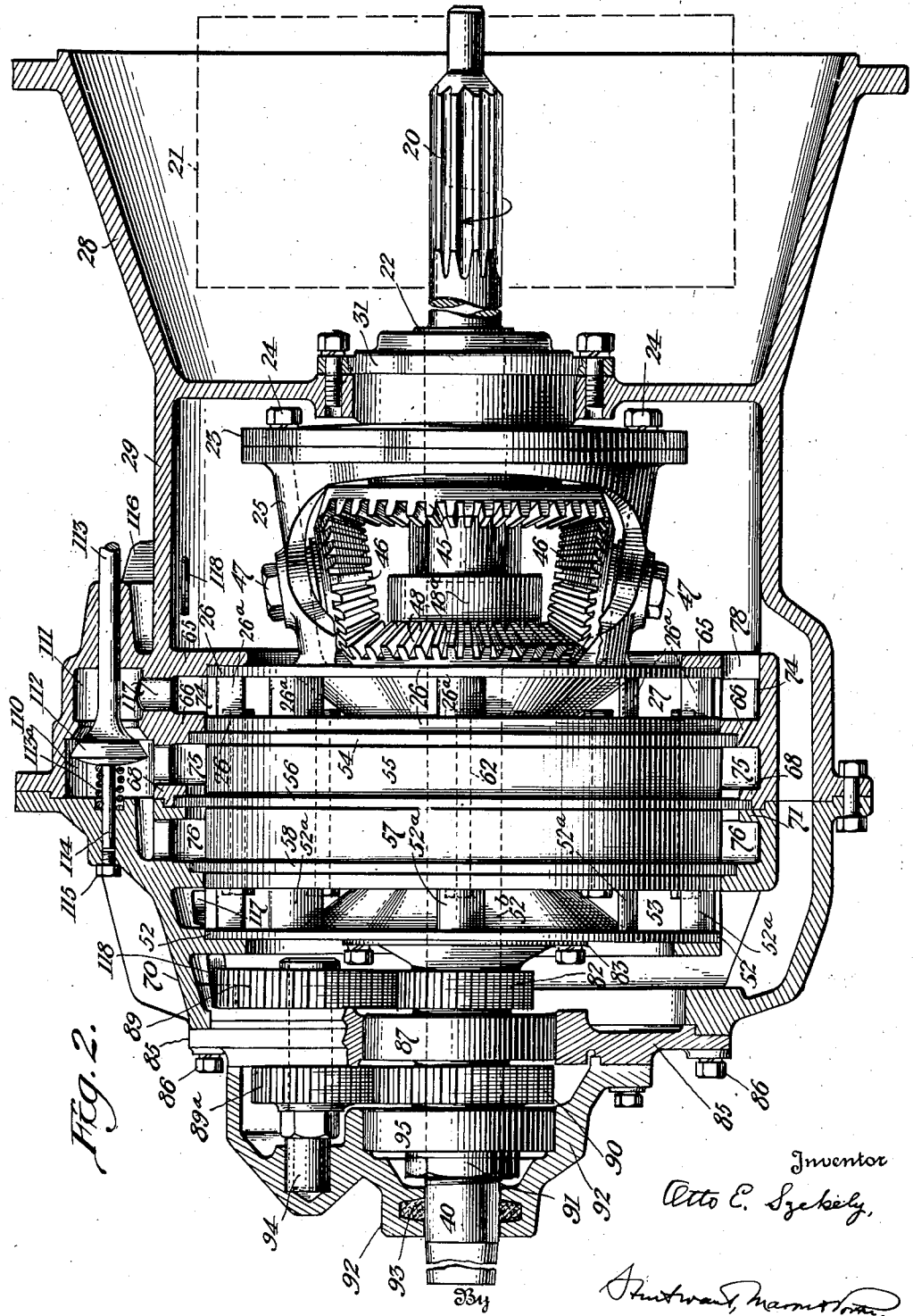

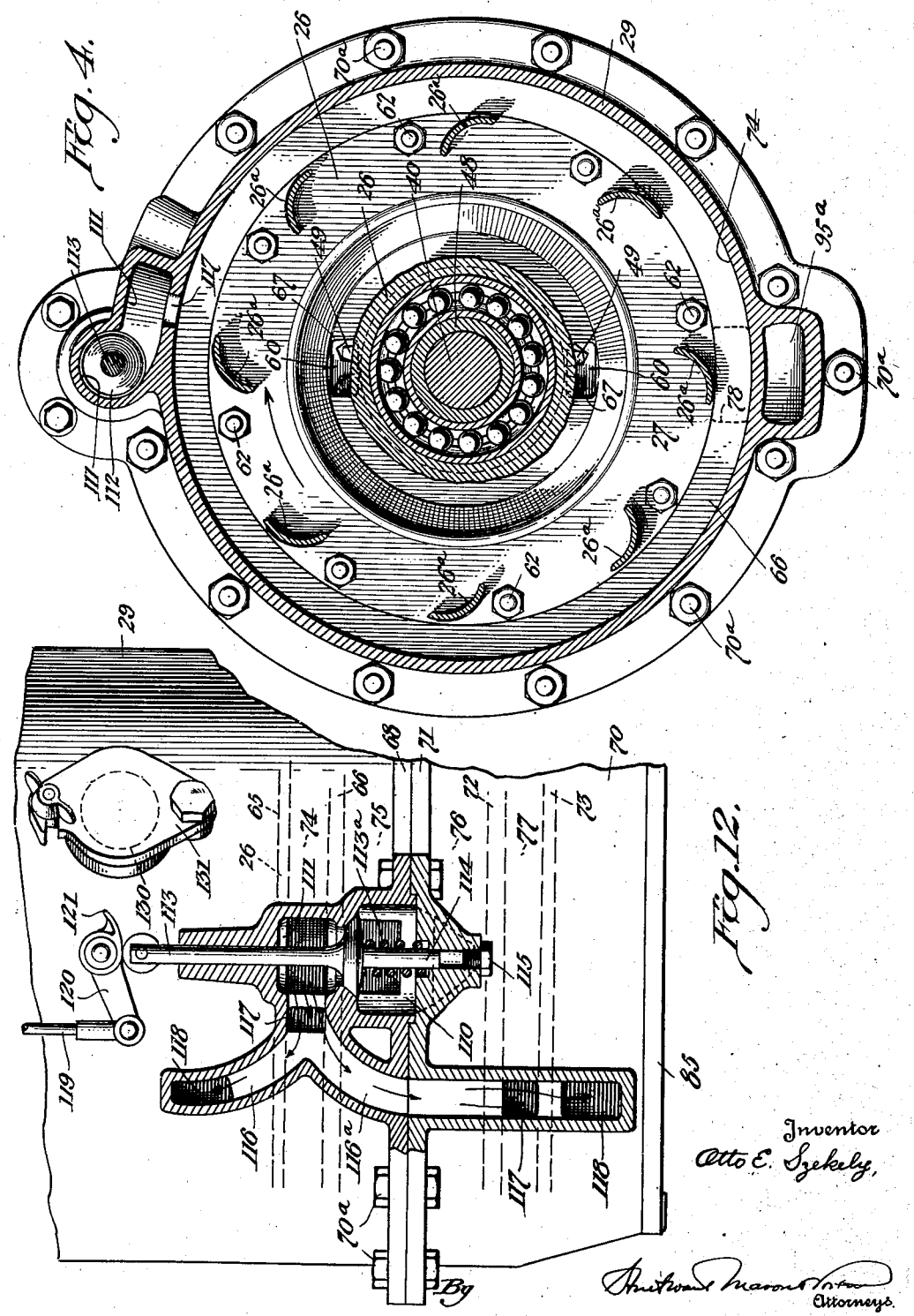

March 28, 1939.  O. E. SZEKELY  2,152,622
VARIABLE RATIO POWER TRANSMISSION
Filed Nov. 19, 1932   6 Sheets-Sheet 5

Inventor
Otto E. Szekely,
By
Attorneys

March 28, 1939.  O. E. SZEKELY  2,152,622
VARIABLE RATIO POWER TRANSMISSION
Filed Nov. 19, 1932  6 Sheets-Sheet 6
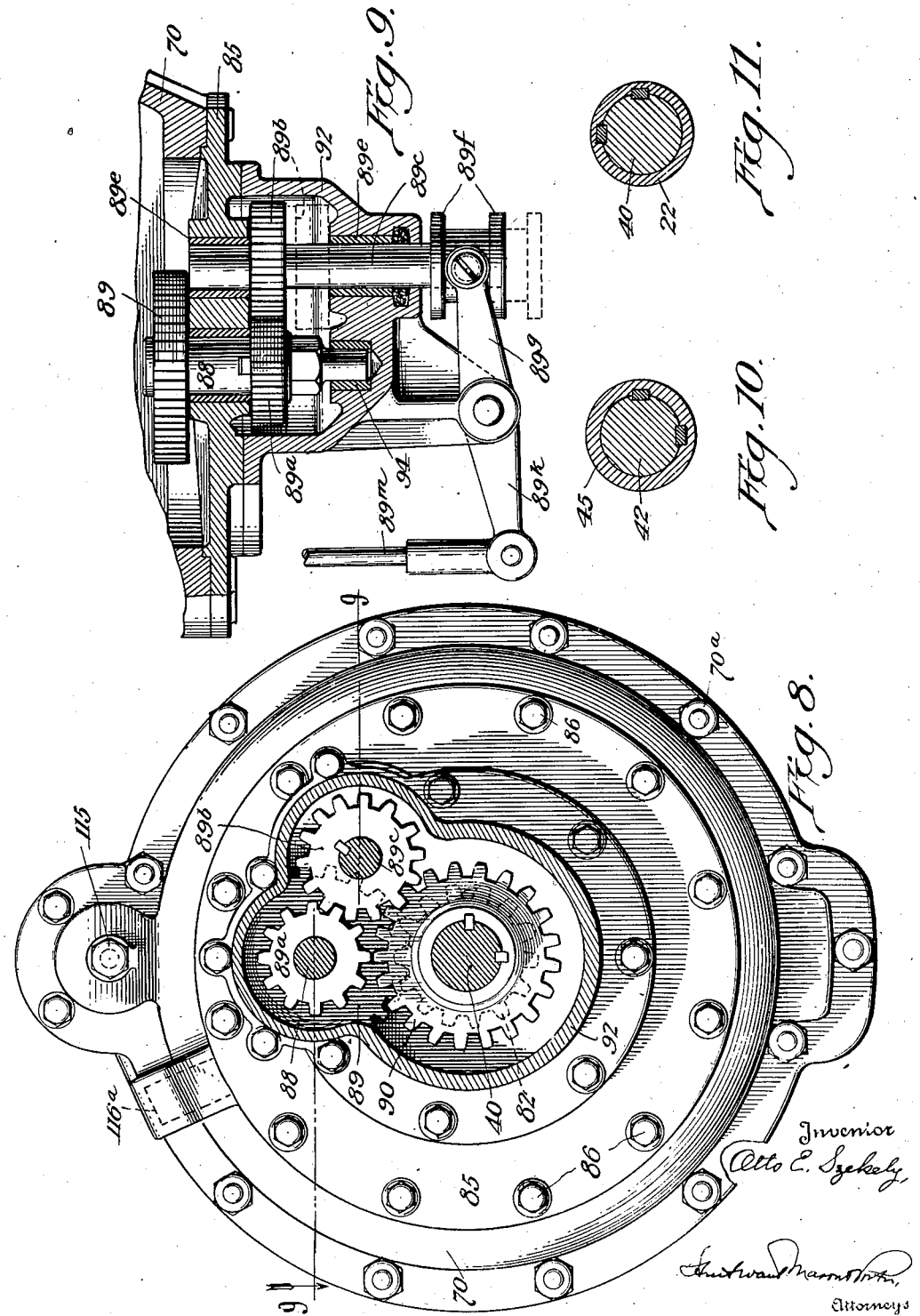

Patented Mar. 28, 1939

2,152,622

UNITED STATES PATENT OFFICE 2,152,622

VARIABLE RATIO POWER TRANSMISSION

Otto E. Szekely, Baltimore, Md., assignor to The Szekely Company, Inc., a corporation of New York Application November 19, 1932, Serial No. 643,451

31 Claims. (Cl. 74—293)

This invention relates to improvements in the art of transmitting power, and affords a means of providing variations in the speed ratios of movement of the driving and driven shafts.

One of the features of the present invention is the provision of a structure including a driving shaft element, a driven shaft element, and a third element independent of the two shaft elements, together with a gear supported by one of said elements and in mesh with teeth on the other two elements, and cooperative means on the driving and third elements for retarding the movement of said third element.

Another feature of the present invention is the provision of a structure including a driving shaft element, a driven shaft element, a third element rotatable independently of said shaft elements and connectable through fluid displacing means to said shaft elements, together with a differentiating and balancing gear carried by one of said elements in mesh with teeth on the other two said elements, and valving means for opposing the flow of fluid from said displacing means.

A further feature of the invention is the provision in a transmission system including a driving shaft and a driven shaft, of load transmission means including a breakable element for determining the ratio of transmission, and means for preventing the movement of the driven shaft at an angular velocity in excess of the angular velocity of the driving shaft.

Still another feature of the invention is the provision of a transmission adaptable for employment in a self-propelled vehicle, which is self-contained and has few moving parts subject to wear and provides, by a simple control of a moving fluid, for variation in the speed and torque ratio of transmission in one direction, together with means for producing a reversed movement of the driven shaft with respect to the driving shaft under predetermined conditions.

A specific feature of this invention is the provision of a transmission comprising a plurality of elements which are capable of simple manufacture and finishing and easy assemblage, and in which the rotating parts are joined securely together for mutual movement or are supported by bearings with respect to one another for relative rotative movement.

With these and other objects in view, as will appear in the course of the following specification and claims, an illustrative form of construction of the device is set out on the accompanying drawings, in which:

Figure 1 is a vertical diametrical section through the transmission structure, indicated as employed in conjunction with a conventional clutch for coupling it to a source of power.

Figure 2 is a similar view, with the internal portions of the transmission structure in elevation, and the housing portions thereof in section.

Figure 3 is a transverse sectional view substantially on line 3—3 of Figure 1, but with the pinions displaced through 90 degrees.

Figure 6:
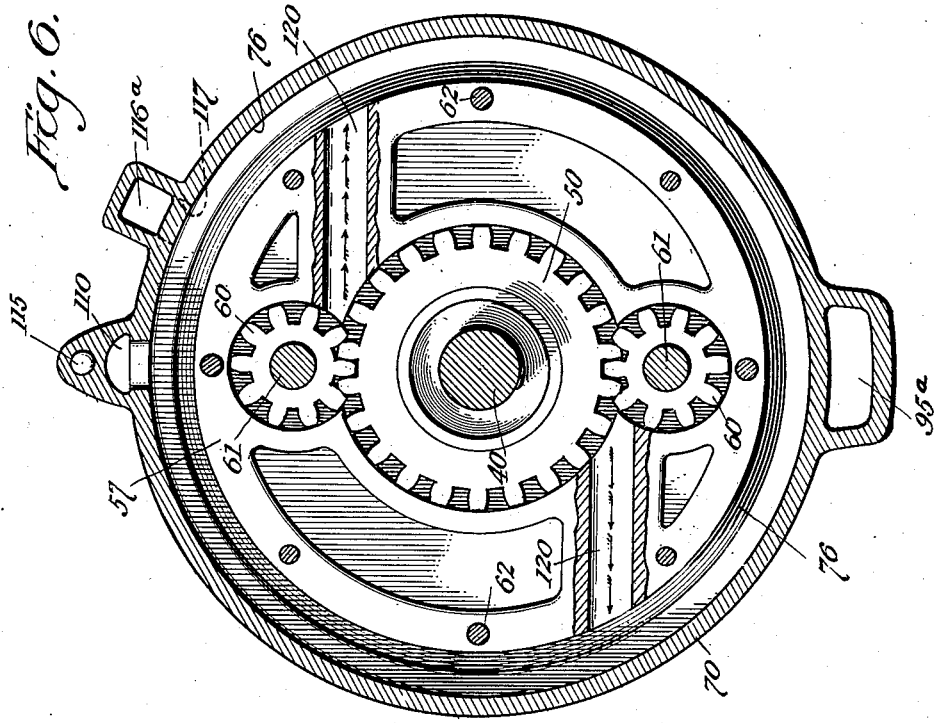
Figure 7:
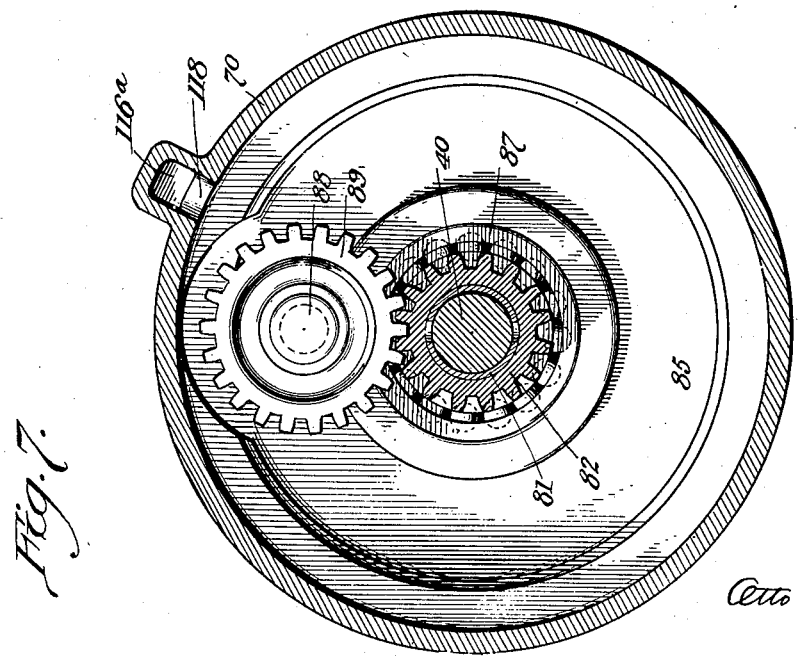

Figures 4, 5, 6, 7 and 8 are respectively transverse sectional views on the corresponding lines 4—4, 5—5, 6—6, 7—7, and 8—8 of Figure 1.

Figure 9 is a sectional view substantially on line 9—9 of Figure 8.

Figures 10 and 11 are sectional views, showing the key connections of the driven and driving shafts, substantially on lines 10—10 and 11—11 of Figure 1.

Figure 12 is a sectional view substantially on line 12—12 of Figure 1.

In the drawings, the driving shaft has a splined portion 20 which is received within the clutch structure 21 (shown in dotted lines in Fig. 1), whereby the clutch serves to connect the driving shaft to a source of power in the usual way. The driving shaft has keyed thereon a collar 22 with a radially extending flange 23 which is secured by cap screws 24 to the spider 25. This spider supports pivots for bevel pinions as described hereinafter and is cut away between the portions which support these pivots to provide openings for the free passage of lubricant to and from the gears: and in addition the spider is provided at the left-hand end in Figs. 1 and 2 with a central hub structure and a pair of spaced radially extending flanges 26, which provide between them an annular passage 27 and which are maintained in their spaced relationship by the curved spacer members or scoop blades 26a (Figs. 3 and 4) which assist by scooping up oil from the general sump and delivering it into the annular passage 27. The outer bell housing 28 surrounding the clutch 21 is extended by a cylindrical portion 29 which surrounds the spider 25. An internal web 30 of the housing 28 receives a closing plate 31, which is secured in position by cap screws 32 and is provided with a packing 33 for preventing the axial movement of oil, etc., along the collar 22. Between the collar 22 and the closing plate 31 is interposed an anti-friction main bearing 34 illustrated as comprising the inner and outer races and interposed balls.

Coaxially arranged with the driving shaft 20 is a driven shaft illustrated as having a cylindrical portion 40, the overrunning clutch portion 41, a second cylindrical portion 42 having keyways therein, a collar 42a, and an end portion 43 which is supported by the anti-friction bearing 44 with respect to the flange 23 of the collar 22. Thus the two shafts are free to turn with respect to one another. Keyed on the portion 42 of the driven shaft is a gear 45 having bevel gear teeth in mesh with the bevel pinions 46, of which two are illustrated in Figs. 1, 2 and 3 (although obviously one or more may be employed), and which are supported on the pivot pins 47 carried by the spider 25. The bevel pinions 46 are likewise in mesh with bevel gear teeth on the sleeve 48 mounted on the cylindrical portion 40 of the shaft and having a portion 48a of cylindrical internal surface in spaced relationship to the overrunning clutch portion 41 of the shaft 40 (Fig. 3). Secured for rotation with the sleeve 48 is the inner gear member 49 of the first fluid displacing mechanism. An anti-friction bearing 25a is interposed between sleeve 48 and the hub of the spider 25. The inner gear member 50 of the second fluid displacing mechanism has an axially extending hub which is keyed to the shaft portion 40. It is preferred to employ a bronze filler bushing 51 between the inner gear 49 and the shaft 40 so that the fluid displacing mechanisms are mounted with a minimum of play and possibility of wear. It will be noted that each of the inner gears 49, 50 have ample internal bearing surfaces for support relative to the shaft portion 40. A hub 52b surrounds the extending hub portion of the internal gear member 50, and has a pair of radially extending flanges 52 which provide between them an annular passage 53 and have as spacer members the curved scoop blades 52a: so that the structure of flanges 52, blades 52a and annular passage 53 is substantially symmetrical with the corresponding structure including flanges 26, blades 26a and annular passage 27.

A baffle disk 54 is seated against the flange 26. The outer ring 55 of the first fluid displacing mechanism (Fig. 5) is seated against the baffle disk 54. A second baffle disk 56 is seated against the ring 55. The outer ring 57 of the second fluid displacing means is seated against the baffle disk 56. Finally, a baffle disk 58 is located between the ring 57 and the flange 52. It will be noted that these baffle disks have central apertures of substantially the same diameter: and that the two end disks 54 and 58 are of substantially the same external diameter and have apertures 67 by which the fluid may move from the radial passages 27, 53 into the corresponding rings 55, 57. The central baffle disk 56 is of larger diameter and is imperforate from its central hole to the outer edge save for reception of pivot pins 61, and thus prevents communication between the two fluid displacing mechanisms therethrough. Each of the fluid displacing mechanisms is provided, in the illustrated form, with a pair of pinions 60 which are constantly in mesh with the respective inner gears 49 or 50, and are supported by the pins 61. Bolts 62 are passed through the flange 26, disk 54, ring 55, disk 56, ring 57, disk 58, and flange 52, so that all of these parts travel together and hence are moved at the same angular velocity as the splined portion 20 of the driving shaft.

An internal flange 65 of the housing extension 29 is rabbeted to fit the flange 26 and to provide between itself and a corresponding internal flange 66, an annular passage (Fig. 4) in which fluid may move from the general space within the housing extension 29 through aperture 78 and annular space 27 to the apertures 67 in the baffle disk 54. The flange 66 is likewise rabbeted to form a snug fit with the baffle disk 54. At the left-hand end of the housing extension 29 is provided an internal flange 68 of internal diameter slightly in excess of that of the baffle disk 54, for easy assembly, and it likewise is rabbeted to receive the baffle disk 56. A secondary housing extension 70 is connected to extension 29 by the bolts 70a and is provided with a flange 71 and a second flange 72 spaced therefrom and rabbeted to receive the baffle disk 58. Finally a flange 73 is provided which is rabbeted to receive the flange 52 of the rotating structure. Thus, it will be noted that the rabbeted flanges and baffle disks and flanges provide, so to speak, a labyrinth packing for preventing the movement of oil past the baffle disks in the axial direction of the mechanism, and also provide the several annular passages 74, 75, 76, 77, of which the passages 74 and 77 are in communication by the aperture 78 and channel 95a with the general fluid sump formed by the housing extensions 29 and 70.

A sleeve 80 having an internal bronze bushing 81 surrounds the shaft portion 40 and is provided with gear teeth 82 and a main flange 83 which latter is fixedly secured to the hub 52b. The bushing 81 is employed to prevent whipping and chatter when the shaft portion 40 is relatively light, and thus maintains the various parts in their predetermined relationship to one another. The gear teeth 82 turn at the same angular velocity as the splined portion 20 of the driving shaft. The end of the housing extension 70, closed by a fixed plate 85 which is secured in position by cap screws 86, receives an anti-friction main bearing 87 for mounting the sleeve 80.

Passing through the end plate 85 (Figs. 1, 2 and 9) is a shaft 88 having a gear 89 on the inner end thereof in mesh with the gear teeth 82, and having on the outer end thereof a gear 89a which is in mesh with a gear 89b keyed to the sliding shaft portion 89c. When gear 89b is in the full line position of Fig. 9, it is in mesh (Fig. 8) with the gear 90 which is keyed to the driven shaft portion 40: but when this gear 89b is withdrawn to the dotted line position of Fig. 9 it is out of mesh and thus does not transmit power through the system. It will be noted that a decrease of speed ratio is provided by the small diameters of the pitch circles of the gears 82 and 89a with respect to the gears 89 and 90. The sliding shaft 89c is indicated (Fig. 9) as supported by bearings 89e in an end cap 92 and is shown as including the fixed collar portions 89f which may be moved back and forth by the bifurcated end 89g of the reversing lever 89k which may be actuated by a reversing link 89m in any desired manner.

A threaded collar 91 is placed at the end of the shaft portion 40 to press the various parts toward the right on this shaft and hold them against the collar 42a: thus, all parts supported by and turning with the shafts are maintained against axial displacement, and the shafts themselves are further assured against undesired axial movement. The central aperture in the closing plate 85 is closed by the end cap 92 having an oil packing 93 therein and providing, preferably, a bearing 94 for an outer end of shaft 88. Likewise, an anti-friction bearing 95 is preferably positioned between the end cap 92 and the hub of gear 90, thus furnishing a support from the housing structure, for the driven shaft, adjacent its free end, which is especially of value during operation of the reversing gears.

The overrunning clutch portion 41 of the driven shaft (Fig. 3) is illustrated as provided with three clutch surfaces 100 of spiral shape for cooperation with the clutch rollers 101, so that upon relative movement of the shaft with respect to the member 48 in one direction, a tight clutching is effected.

The annular chambers 75, 76 open into a valve inlet chamber 110 having communication past the valve seat with a second valve chamber 111 which communicates through channels 116, 116a in bosses of the housing and through ports 116 and 117 with the annular chambers 74 and 77, and through these channels and the ports 118 with the general sump formed by the housing extensions 29 and 70, so that fluid forced past the valve seat is returned to the general sump. This valve seat may be closed more or less by a valve 112 which is guided by its stem 113 and is urged toward closed position by the fluid pressure and the action of the valve spring 113a. A stem extension 114 of the valve likewise serves to guide it and operates after a predetermined valve opening movement to engage an adjustment screw 115 and thus establish a maximum opening for the passage of fluid. The valve may be opened by traction on a transmission-ratio regulating link 119 which rocks a lever 120 having a cam piece 121 thereon for moving the valve stem 113.

As shown in Figs. 5 and 6, the outer rings 55 and 57 of the two fluid displacing means are identical but are oppositely disposed about the axis of driven shaft 40. Each of them is provided with a central space for the reception of the inner gear member 49 or 50 of the respective fluid displacing means, with communicating recesses for the pinions 60 of the respective fluid displacing means, and with chordal discharge passages 120 through which the fluid is forced by the action of the gears into the respective surrounding annular chamber 75 or 76.

In order to inspect, replenish or replace the oil supply within the housings, a filling opening 130 may be provided (Fig. 12), which may be covered by any desired type of closure 131.

In operation, assuming that the clutch 21 is causing the rotation of the driving shaft spline 20 and therewith the collar 22, flange 23, spider 25, the rings and baffle disks, and gear teeeth 82, and that the driven shaft 40 is at a standstill relative to the housing and the bevel gear 45 is likewise motionless, the movement of the pins 47 with spider 25 causes the bevel pinions 46 to travel on gear 45. This, however, produces a movement of the bevel gear 48 at twice the angular velocity of the driving shaft. Hence, the inner gear 49 of the first fluid displacing means turns at twice the speed of its outer ring 55, so that the pinions 60 thereof are rotated and fluid is drawn from the general sump through aperture 78 into annular passages 74 and 27 and thence between the gear members and thence is discharged (Fig. 5) through the chordal passages 120 into the annular passage 75 and thus moves to the chamber 110, past the open valve 112, through chamber 111, and thus back to the general sump. Likewise, the other ring 57 and its pinions 60 are moving relative to the stationary inner gear 50, and the fluid thus displaced circulates by a similar path. Substantially no resistance to fluid displacement is thus imposed upon the system, and the driven shaft is not moved.

However, when a closing movement is given to the valve 112, greater and greater back pressures are built up, and the ultimate tendency is for the inner gear 49 to be moved at the same angular velocity as the outer ring 55. This can only occur when the bevel pinions 46 are not rotating on their pins 47, i. e. when the bevel pinions are producing a rotation of the bevel gear 45 and therewith of the driven shaft. Any blockage of the free flow of this fluid, by the closing of valve 112, also tends to prevent rotation of the pinions 60 of ring 57, and thus to bring the corresponding inner gear 50 into rotation, which may only be accomplished by moving the driven shaft.

Thus it will be noted that two channels of power are established for the transfer of energy from the driving shaft to the driven shaft, each of which includes a fluid displacing mechanism, and that an obstruction valve is provided to limit the flow from the two fluid displacing means: and since the fluid displacing means include elements coupled to the driving shaft, elements coupled to the driven shaft, and a free element which is retarded in its movement by obstruction of the flow of fluid, it is obvious that this obstruction of flow determines the ratio of transmission from one shaft to the other. Further, it will be noted that each of the fluid displacing means receives its supply of fluid from the general sump at substantially the same inlet pressure; and delivers its fluid into the annular chambers and the valve inlet chamber 110 in which a balancing of pressure must occur. Further, a mechanical balancing also occurs through the interdependent gear system of bevel gears 45 and 48 and the bevel pinion 46. Hence the loads on the two fluid displacing means are equal.

The above procedure continues until the two shafts are moving at the same angular velocity. In the preferred arrangement shown, upon any tendency toward increase of speed of the driven shaft beyond the angular velocity of the driving shaft, the overrunning clutch portion 41 operates through the rollers 101 to lock the driven shaft to the gear 48. Therefore, under such conditions, the gears 45 and 48 are held in fixed angular position relative to one another and have no tendency to turn the bevel pinions 46: and hence a direct coupling or drive is accomplished from the driving shaft to the driven shaft. This condition occurs when the valve 112 is closed, and it will be noted that at this time the inner gears 49 and 50 and their pinions 60 are no longer actually displacing fluid owing to the back pressure existing at their outlet passages 120, but are turning bodily at the same angular velocity as the corresponding rings 55 and 57.

At the moment of reopening the valve 112, fluid is permitted to pass from the annular chambers 75 and 76, and the rings 55 and 57 may move angularly relative to the inner gears 49 and 50. Such movement tends to release the former driving relationship and to establish a lesser speed ratio of transmission. It will be noted, however, that if the device is employed with a self-propelled vehicle, the vehicle may always be braked from its engine if and providing the speed of the vehicle is greater than that which would be given it by the engine.

In order to reverse the drive of the driven shaft from the driving shaft, the valve 112 is opened wide so that no drag occurs through the gear pumps. As shown in Fig. 8, the gear 89a is brought into mesh with the idler gear 89b which is in mesh with gear 90. The gear teeth 82 thus operate through the gear train to produce a movement of the driven shaft in the reverse direction.

It will be noted that the assembly in this transmission is substantially that of a differential in which the differential housing (spider 25) is driven from the source of power and carries with it the planetary pinions 46. One of the sun gears (here gear 48) is coupled to a braking device, here the inner gear 49 of a fluid displacing mechanism. The other sun gear 45 is fixed to the driven shaft 40 and to a second braking device, here the inner gear 50 of a second fluid displacing mechanism. With such a differential, the sum of the speeds of the two sun gears is twice the speed of bodily movement of the axes of the planet pinions, i. e. the sum of the angular speeds of the two sun gears is twice the angular speed of the housing. When one sun gear is at a standstill, the other is turning at twice the speed of the housing. Further, when the two sun gears are turning at the same speed, the angular velocity of each sun gear is equal to the angular velocity of the housing.

The displacement of fluid under pressure is proportionate to the peripheral speed. Since the fluid displacing means are connected each to a sun gear, and the sum of the speeds of the two sun gears is twice the speed of the driving shaft, it will be noted that the total displacement by the two fluid displacing means remains consant for a given speed of the driving shaft. When one fluid displacing means is displacing a maximum, the other is tending to displace a minimum, or vice versa. When the two fluid displacing means are delivering equal quantities, each such quantity being one-half of the total, the relative differences of speeds between the outer rings 55, 57 and the inner gears 49, 50 are identical.

Assume that at the start of an operation the driving shaft 20 is being rotated at 500 R. P. M., so that the spider 25, rings 55 and 57, and all parts connected thereto are likewise turning at 500 R. P. M., and assume further that the driven shaft 40 is at a standstill, along with its sun gear 45 and the inner gear 50 of the second fluid displacing mechanism. The planet pinions 46 are carried bodily with the spider 25 and roll on the stationary sun gear 45; and hence the second sun gear 48 is being driven at twice the engine speed, or 1000 R. P. M. The sum of the angular speeds of the two sun gears 45 and 48 is 1000 R. P. M., which is twice the driving shaft speed of 500 R. P. M. The inner gear 49 of the first fluid displacing mechanism is rotating at 1000 R. P. M. Both the inner gear 49 and the housing and ring assembly are turning in the same angular direction. Ring 57 is turning at 500 R. P. M. with respect to its inner gear 50 and the driven shaft 40. On the other hand, the inner gear 49 (1000 R. P. M.) is overrunning the ring 55 (500 R. P. M.) by 500 R. P. M. Both fluid displacing means are therefore operating by a relative differential of movement between the outer ring and inner gear thereof of 500 R. P. M., and since the fluid displacing means are of the same size in the specific illustration, they may be considered as displacing 500 units of fluid each, or a total of 1000 units per minute.

The valve 112 is wide open and this output of 1000 volume units passes freely in circulation through the two fluid displacing means to the sump, and through the adjunct passages.

If now the valve 112 be slightly closed, a back pressure is created on both of the fluid displacing means. The engine speed may be assumed as constant, and hence the driving shaft 20 and the spider 25 along with the outer rings 55 and 57 continue to turn at 500 R. P. M. The back pressure of fluid causes the inner gear 49 to slow down, as the load on the area of the teeth of the fluid displacing means reduces the speed proportionately to the increase of back pressure so long as the torque upon the fluid displacing means remains unchanged. The decrease in speed of inner gear 49, however, results in a slowing down of the sun gear 48. Since, however, the sum of the speeds of the two sun gears 45 and 48 must remain constant for a constant speed of the driving shaft 20, a turning effort is exerted through the planetary pinions 46 tending to rotate the sun gear 45 in the same angular direction as the driving shaft 20 and the sun gear 48. This effort is increased by a smaller number of teeth on the sun gear 48, compared with the number of teeth on the sun gear 45, so that a high starting torque is applied to the driven shaft 40, and the latter starts into movement.

At the same time, however, the back pressure at the second fluid displacing mechanism tends to cause a blockage so that its parts will turn at the same speed: In other words, the ring 57 will drag the inner gear 50 with it. Thus, again, a torque is exerted on the driven shaft 40 from the driving shaft 20, but this time through the agency of the second fluid displacing mechanism including the outer ring 57 to the inner gear 50. Since the inner gears 49 and 50 are connected to the two sun gears 48 and 45, and the outer rings 55 and 57 turn at the same speed as the driving shaft 20, and this speed has been assumed as constant, the speeds of the two inner gears 49 and 50 retain such a ratio that the sum of the speeds is constant and twice the speed of the driven shaft 20. Hence the inner gear 49 has slowed in the same ratio that the other gear 50 has speeded up; and the total output of the two fluid displacing means remains constant. Hence, again, the resistance opposed by valve 112 to the flow of fluid under pressure remains constant, since the area of passage is the same and the volume of delivery is unchanged. Ultimately, for any given position of the valve 112, a ratio of speeds of the two inner pump gears 49 and 50 is obtained at which the pressure resistance is sufficient to prevent speeding up of either fluid displacing means, so to speak, and at the same time is sufficient to permit the passage of the fluid delivered by the two fluid displacing means. At this condition of equilibrium, a definite speed ratio of transmission is existing between the driving shaft 20 and the driven shaft 40.

If the valve 112 be entirely closed, the two fluid displacing means are totally blocked, so to speak, and the inner gears 49 and 50 turn at the same angular velocities as the outer rings 55 and 57, and hence at the same speed as the driving shaft 20. The sun gears 45 and 48 are then turning with the same angular velocity as the spider 25. If the shaft 40 tends to exceed this speed, from any cause, the overrunning clutch portion 41 produces engagement of the rollers and the parts are fixedly locked together so that a simple and direct drive results with the housing, pinions, sun gears, rings, pinions, and gears all turning at the same angular speed.

What has been described for speed ratio of transmission is likewise true for load ratio of transmission, i. e. driving torque, but in inverted ratio.

The braking means operative between the driving member and the third member produces an action upon the third member as a tangential pressure effect which retards it and reduces its velocity from a maximum, which prevails when the driven member is at a standstill, down to the velocity of the driving member when "direct drive" is occurring; and the corresponding reaction pressure is exerted upon the driving member and results in relieving the source of energy from a portion of the energy demand thereon. When the speed ratio of the driven member with respect to the driving member is low, the corresponding torque ratio is high; and both these ratios tend to approach unity, or equality of torque and speed at the driving and driven members, as "direct drive" is approached. For example, if, for a period of time during which the members are performing relative movements with respect to one another, the energy output and velocity of the source are maintained constant and the load upon the driven member at the prevailing speed is not equivalent to this energy output so that the energy is not all absorbed in maintaining such prevailing speed, the speed of the driven member automatically is increased until the energy demanded by the load upon the driven member at the new speed is equivalent to the energy output of the source. Again, if the energy demanded by the load on the driven member increases at any prevailing speed thereof (thus, if an automobile passes from a level road onto an upward grade) when there has previously been equivalence between the demand at the driven member and the output at the source (while the automobile was traveling on the level) and the energy output and velocity of the source are maintained constant, then an automatic slowing down of the driven member occurs until equivalence again exists at the lower speed and the greater torque ratio. That is, the load upon the driven member automatically regulates the transmission so that the energy demand as determined by the torque and speed ratios is maintained in equivalence with the energy output of the source. The adjustment or position of the control valve determines the back pressure of braking action, and thus determines the rate at which the system will pass from the formerly prevailing speed to such new speed.

The braking means operative between the driving member and the driven member assists, as set out above, in bringing the driven member up to and maintaining it at the speed of the driving member, and is especially of value in the initial starting period.

In the preferred form of construction illustrated, it will be noted that many of the parts are symmetrical or identical in shape, and that they may be manufactured or finished by simple turning and boring operations, whereby the cost of manufacture is reduced to a minimum. The driving shaft and its connected parts are supported on radial walls 30 and 85 associated with the housings by anti-friction bearings 34 and 87 which are located adjacent the ends of these connected parts. Likewise the driven shaft is supported within the driving shaft by anti-friction main bearing 44 adjacent its free end, so that these two shafts are maintained free for easy concentric movement. In addition, the driven shaft is supported by the anti-friction bearing 95 directly from the housing member; and also the independent gear member 48 is supported with respect to the driving shaft parts by an anti-friction bearing 25a. By reason of the large radial dimensions of the parts associated in the driving shaft structure, there is little or no tendency for whipping movements of these parts.

The driven shaft is supported adequately against such whipping by the interengagement of driving shaft portions therewith, substantially throughout its length.

While a preferred arrangement has been shown and described, it is obvious that the invention is not limited thereto, but that many changes may be made within the scope of the appended claims.

Having thus described the invention, what I claim as new and desire to secure by Letters Patent, is:

1. A transmission system comprising a driving shaft member, a coaxial driven shaft member, a coaxial third member revoluble relative to said shaft members, gear teeth on said driven shaft and third members, a gear mounted on said driving shaft member and meshing with said gear teeth of both said other members; a first fluid displacing means including a first portion rotatable with said driving shaft member and a second portion rotatable with said third member; a second fluid displacing means including a first portion rotatable with said driving shaft member and a second portion rotatable with said driven shaft member, means for supplying fluid to said fluid displacing means, a common fluid outlet from said fluid displacing means, and a valve for controlling said outlet.

2. A transmission system comprising a driving shaft member, a driven shaft member, a third member revoluble relative to said shaft members, a gear in meshing engagement with two of said members and carried in rotation with the other said member, first braking means interposed between said other member and one of said two members, and a second braking means interposed between said other member and the second of said two members.

3. A transmission system as in claim 2, including means for coordinately controlling the effects of said braking means.

4. A transmission system comprising a driving member, a driven member, a third member revoluble relative to said driving and driven members, a gear in constant meshing engagement with the driven and third members and journaled on and carried bodily with the said driving member in its movement, first braking means interposed between said driving member and one of the other members, and a second braking means interposed between said driving member and the second of the other members.

5. A transmission system comprising a driving member, a driven member, a third member revoluble relative to said driving and driven members, a gear in constant meshing engagement with the driven and third members and journaled on and carried bodily with the said driving member in its movement, first braking means interposed between said driving member and one of the other members, a second braking means interposed between said driving member and the second of the other members, and compensating means for equalizing the braking efforts of said means.

6. A transmission system comprising a driving shaft, a driven shaft, a member revoluble relative to said shafts, a pair of spaced fluid conducting elements, a pair of fluid displacing means each including a housing and an internal gear, the internal gear of one said fluid displacing means being connected to the driven shaft and the gear of the other fluid displacing means being connected to said member, said elements and housings being connected rigidly for rotation with the driving shaft, and independent means for transmitting energy from said driving to said driven shaft.

7. A transmission system as in claim 6, in which said independent transmitting means includes gear teeth fixed to the driven shaft and said member, and a pinion meshing with said gear teeth and pivoted on and carried bodily in revolution with said driving shaft.

8. A transmission system as in claim 6, in which said independent transmitting means includes gear teeth fixed to the driven shaft and said member, a pinion meshing with said gear teeth and pivoted on and carried bodily in revolution with said driving shaft, and means for preventing the driven shaft from turning faster than the driving shaft.

9. A transmission system comprising a driving member, a driven member, a third member movable relative to said driving and driven members, a gear in meshing engagement with said driven and third members and journaled on and carried bodily with said driving member in its movement, braking means interposed between said driving member and said third member, and overrunning clutch means cooperative with said members for preventing said driven member moving faster than said driving member.

10. A transmission system comprising a driving shaft and a concentric driven shaft, a pair of fluid displacing means each including relatively movable first and second portions, said first portions being connected to said driving shaft and surrounding said driven shaft, a member surrounding said driven shaft and connected to the second portion of one said fluid displacing means, the second portion of the other fluid displacing means being connected to said driven shaft, concentrically arranged gear teeth on said driven shaft and member, and a pinion pivotally mounted on and carried in revolution with said driving shaft and in mesh with both sets of said gear teeth, a housing surrounding said shafts and providing a sump for fluid, said fluid displacing means having a common outlet, and a valve for controlling the flow of fluid from said common outlet into said sump.

11. A transmission system as in claim 10, in which said housing is provided with main bearings for directly supporting said driving shaft and fluid displacing means at axially spaced points, and in which the driving shaft structure is provided with axially spaced bearings for supporting said driven shaft and said member.

12. A transmission system comprising a source of energy, a driving member rotated by said source, a revoluble driven member, a third member revoluble relative to both said driving and driven members, gearing for connecting said members and including a pinion journaled on and carried bodily in rotation with said driving member so that said third member is driven in the same direction as and faster than said driving member so long as the driving member is turning faster than the driven member, and means including elements respectively connected to said driving and third members for exerting a pressure upon said third member for retarding the same and simultaneously imposing the reaction of said pressure upon said driving member for relieving said source from supplying a part of the energy demanded by said driving member.

13. A transmission system comprising a rotatable driving member, a revoluble driven member having a large gear, a third member revoluble relative to both said driving and driven members and having a smaller gear, differentiating gearing including said gears and planet pinion means in mesh therewith for transferring relative motion and load between said gears, said pinion means being journaled on and movable bodily with the driving member in its movement, and means for establishing a tangential pressure effect upon said third member for retarding the same and simultaneously imposing a corresponding reaction pressure effect through said driving member and gearing upon said driven member.

14. A transmission system comprising a rotatable driving member, a revoluble driven member having a large gear, a third member revoluble independently of both said driving and driven members and having a smaller gear, planet pinion means in mest with both said gears and mounted for movement bodily with said driving member in its rotation so that tangential pressure may be exerted from said driving member through said pinion means upon both said gears, and means for establishing a tangential pressure upon said third member for retarding the rotation thereof and simultaneously exerting the tangential reaction pressure upon said driving member in the direction of its rotation, the effective lever arm at which said reaction pressure is exerted being greater than the mean diameter of said large gear whereby the retardation of said third member operates through said pinion means to compensate the tangential pressure exerted through said pinion means by said driving member.

15. A transmission system comprising a rotatable driving member, a revoluble driven member, an epicyclic gearing for connecting said members and including a third member revoluble independently of both said driving and driven members, reacting means for connecting said third member and said driving member for retarding the revolution of said third member, and means for preventing said driven member from revolving faster than said driving member.

16. A transmission system comprising an epicyclic gearing including two sun gears and a spider carrying at least one planet gear in mesh with said sun gears, a driving shaft operatively connected to said spider, a driven shaft connected to one said sun gear, means for retarding the revolution of said other sun gear, and means for preventing said driven shaft from rotating faster than a predetermined ratio to said driving shaft.

17. A transmission system comprising an epicyclic gearing including a large sun gear and a small sun gear and a spider carrying at least one planet gear in mesh with said sun gears, a driving shaft operatively connected to said spider, a driven shaft connected to the large sun gear, a member rotated with said driving shaft, a member rotated with said small sun gear, reaction means cooperatively engageable with said members for decreasing the speed of said small sun gear member relative to the speed of said driving shaft member, a further member connected to said driven shaft, and a second reaction means connected to said further member and to said small sun gear member for decreasing the speed of said small sun gear member relative to the speed of said driven shaft member.

18. A transmission system comprising an epicyclic gearing including a large sun gear and a small sun gear and a spider carrying at least one planet gear in mesh with said sun gears, a driving shaft operatively connected to said spider, a driven shaft connected to the large sun gear, a member rotated with said driving shaft, a member connected to said small sun gear for rotation therewith, braking means cooperatively engageable with said members for bringing said small sun gear to the same rotational speed as said driving shaft, and means for preventing said driven shaft from turning faster than said driving shaft.

19. A transmission system comprising a rotatable driving member, a revoluble driven member, an epicyclic gearing for connecting said members and including a third member revoluble relative to both said driving and driven members, means for establishing a tangential pressure effect between said third member and said driving member for retarding said third member and operating to impose the corresponding tangential reaction pressure effect through said driving member and gearing upon said driven member, and means for preventing said driven member from turning faster than said driving member.

20. A transmission system comprising a driven member having a gear fixed thereto, a coaxial driving member, a coaxial third member revoluble relative to said driven and driving members and having a gear fixed thereto, a gear on said driving member in mesh with both said gears and having its axis carried in revolution about their common axis during rotative movement of said driving member, braking means for retarding the rotation of said third member and connected to deliver the braking reaction to said driving member, and independent means for coupling said driven and driving members when said driven member tends to exceed a predetermined speed ratio relative to said driving member.

21. A transmission system comprising a driven member having a large gear fixed thereto, a driving member having a gear pivoted thereto in mesh with said large gear, a third member having a small gear fixed thereto in mesh with said driving member gear, a fluid displacing means including elements connected to said third member and to said driving member, and a device for controlling the back pressure on said fluid displacing means.

22. A transmission system comprising a driven member having a first gear fixed thereto, a coaxial driving member having a second gear pivoted thereon in mesh with said first gear, a coaxial third member having a third gear fixed thereto in mesh with said driving member gear, a fluid displacing means including elements connected to said driving and third members whereby the output of said fluid displacing means is determined by the relative speeds of said third member and driving member, a device for controlling the back pressure on said fluid displacing means, and means for preventing said driven member from turning faster than said driving member.

23. A transmission system comprising a driving member, a driven member, a third member movable relative to said driving and driven members, mechanical coupling means pivotally mounted on and moved with said driving member and constantly engaged with said driven and third members so that said third member is moved in the direction of and faster than said driving member when said driving member is moving faster than said driven member, and braking means including cooperative elements connected to said driving and third members operative for producing a retarding action upon said third member and imposing the corresponding reaction upon said driving member.

24. A transmission system comprising a driving member, a driven member, a third member; said members being rotatable relative to one another about a common axis; differentiating gearing connecting said members and including pinion means journalled on said driving member for bodily movement during the rotation of said driving member; liquid displacing means including a housing connected for rotation with said driving member, and a displacing element connected to said third member and located in said housing, said housing having in its end wall an axially directed inlet passage for delivering liquid to said displacing element and having in its peripheral wall an outlet passage opening to its peripheral surface for discharging liquid; conduit means for the movement of liquid to said inlet passage, and means for restricting the flow of liquid through said outlet passage.

25. A transmission system comprising a housing providing a sump for liquid, a driving member rotatable in the housing, a driven member rotatable in the housing, a third member rotatable in the housing relative to said driving and driven members, a gear in meshing engagement with said driven and third members and journalled on and carried bodily with the said driving member in its rotation, fluid displacing means including elements connected to said driving and third members whereby the output of said fluid displacing means is determined by the relative speeds of said third and driving members, said driving member including an axial passage for admitting liquid from said sump to said fluid displacing means and a discharge passage opening at the periphery of the driving member through which liquid may move from the fluid displacing means toward said sump, and means to control the discharge of liquid through said discharge passage.

26. A transmission system comprising a driving member, a driven member, a third member revoluble relative to said driving and driven members; differentiating gearing connecting said members; a gear pump comprising a large pump gear connected to said third member, a small pump gear in mesh therewith, a pump housing connected for rotation with said driving member and enclosing said pump gears and having inlet and discharge passages; and means for controlling the back pressure in said pump.

27. A transmission system comprising a driving member, a driven member, a third member revoluble relative to said driving and driven members; differentiating gearing connecting said members including a large sun gear connected to said driven member, a small sun gear connected to another said member, and a planet pinion carried bodily in revolution with still another said member; a gear pump comprising a large pump gear connected to said third member, a small pump gear in mesh therewith, a pump housing connected for rotation with said driving member and enclosing said pump gears and having inlet and discharge passages; and means for controlling the back pressure in said pump.

28. A transmission system comprising a driving member, a driven member, a third member revoluble relative to said driving and driven members; differentiating gearing connecting said members including a large sun gear connected to said driven member, a small sun gear connected to said third member, and a planet pinion carried bodily in revolution with said driving member; a gear pump comprising a large pump gear connected to said third member, a small pump gear in mesh therewith, a pump housing connected for rotation with said driving member and enclosing said pump gears and having inlet and discharge passages; and means for controlling the back pressure in said pump.

29. A transmission system comprising an epicyclic gearing including a large gear and a small gear and a spider carrying at least one planet gear in mesh with said gears, a driving shaft operatively connected to said spider, a driven shaft connected to the large gear, said gearing connecting said driving and driven shafts and operating to compel said small gear to turn in the same direction as said driving and driven shafts and faster than the driving shaft at a rate proportioned to the difference in rates of speed of the driving and driven shafts, and fluid-displacing braking means including a structure fixed to the spider and a structure fixed to said small gear and including means for regulating the back pressure upon fluid displaced by said fluid-displacing braking means for retarding the revolution of said small gear with relation to said driving shaft.

30. A transmission system comprising a driven member having a large gear, a driving member having a gear journaled on and carried bodily in movement therewith and constantly in mesh with said large gear, a third member having a small gear constantly in mesh with said driving member gear, said gears constituting a differentiating gearing for causing said driven and third members to turn in the same direction as said driving member and with said third member turning faster than the driving member at a rate proportioned to the difference in rates of speed of the driving and driven members, and braking means interposed between said driving member and said third member, said braking means including a part connected to said driving member and a part connected to said third member, and means for regulating the braking effort exerted between said members, said regulating means being effective in one position for permitting the driving member to revolve without substantial effect upon the third member, and being effective in another position for causing the driving member to rotate the third member at substantially the speed of the driving member.

31. A transmission system comprising a rotatable driving member, a revoluble driven member, an epicyclic gearing for connecting said members and including a third member revoluble relative to both said driving and driven members and compelled by said gearing to turn in the same direction with said driving member and faster than the driving member at a rate proportioned to the difference in rates of speed of the driving and driven members, and fluid-displacing means for establishing a tangential pressure effect between said third member and said driving member for imposing a retarding action upon said third member and operating to impose the corresponding tangential reaction pressure effect through said driving member and gearing upon said driven member and including means for regulating the back pressure at said fluid-displacing means and therewith the said tangential pressure effect from a substantially negligible effect to an effect capable of causing the third member to turn at the speed of the driving member.

OTTO E. SZEKELY.